United States Patent
Duan et al.

(10) Patent No.: US 10,810,490 B2
(45) Date of Patent: Oct. 20, 2020

(54) CLUSTERING METHOD BASED ON ITERATIONS OF NEURAL NETWORKS

(71) Applicant: Beijing University of Technology, Beijing (CN)

(72) Inventors: Lijuan Duan, Beijing (CN); Bin Yuan, Beijing (CN); Song Cui, Beijing (CN); Jun Miao, Beijing (CN); Junfa Liu, Beijing (CN)

(73) Assignee: Beijing University of Technology, Beijing (CN)

( * ) Notice: Subject to any disclaimer, the term of this patent is extended or adjusted under 35 U.S.C. 154(b) by 1292 days.

(21) Appl. No.: 15/018,656

(22) Filed: Feb. 8, 2016

(65) Prior Publication Data
US 2017/0161606 A1   Jun. 8, 2017

(30) Foreign Application Priority Data
Dec. 6, 2015 (CN) .......................... 2015 1 0885998

(51) Int. Cl.
*G06N 3/08* (2006.01)
(52) U.S. Cl.
CPC ..................................... *G06N 3/08* (2013.01)
(58) Field of Classification Search
CPC ....................................................... G06N 3/08
See application file for complete search history.

(56) References Cited

PUBLICATIONS

He et al ("Clustering in extreme learning machine feature space" 2013 [Online] Downloaded Apr. 21, 2020 https://www.sciencedirect.com/science/article/pii/S092523121301000X (Year: 2013).*
Na, Shi. Liu Xumin, and Guan Yong. "Research on k-means Clustering Algorithm" IEEE 2010 [Online] Downloaded Apr. 21, 2020 https://ieeexplore.ieee.org/stamp/stamp.jsp?tp=&arnumber=5453745 (Year: 2010).*

* cited by examiner

*Primary Examiner* — Ben M Rifkin
(74) *Attorney, Agent, or Firm* — Platinum Intellectual Property LLP

(57) ABSTRACT

The present invention relates to a clustering method based on iterations of neural networks, which comprises the following steps: step 1, initializing parameters of an extreme learning machine; step 2, randomly choosing samples of which number is equal to the number of clusters, each sample representing one cluster, forming an initial exemplar set and training the extreme learning machine; step 3, using current extreme learning machine to cluster samples, which generates a clustering result; step 4, choosing multiple samples from each cluster as exemplars for the cluster according to a rule; step 5, retraining the extreme learning machine by using the exemplars for each cluster obtained from step 4; and step 6, going back to step 3 to do iteration, otherwise obtaining and outputting clustering result until clustering result is steady or a maximal limit of the number of iterations is reached. The present invention resolves problems that how to realize clustering of high dimensional and nonlinear data space and that the prior art consumes a larger memory or need longer running time.

4 Claims, 2 Drawing Sheets

CLUSTERING METHOD BASED ON ITERATIONS OF NEURAL NETWORKS

TECHNICAL FIELD

The present invention generally relates to a method for resolving classic clustering issues in machine learning, in particular to an extreme learning machine algorithm which is an improvement of neural networks.

BACKGROUND

Data clustering is always an important research in engineering systems and computational science. In this age of big data with information explosion, business requirement related to data processing is increased day by day, and data to be processed is becoming more and more complicated. As intensive study of clustering is made, new clustering methods are continuously proposed. Traditional clustering algorithm, such as k-means clustering algorithm, expectation maximization algorithm and hierarchical clustering algorithm, is fast, but only adapts to situation of which data space is linearly separable. New clustering algorithm, such as spectral clustering algorithm, deep autoencoder, and unsupervised extreme learning machine, can resolve clustering issues in high dimensional and linearly inseparable data space, but generally need to consume a larger memory or need longer running time.

At present, to cluster large-scale and complex data, clustering algorithm is required to be capable of processing high dimensional and linearly inseparable data and reduce cost of memory and running time. The present invention resolves clustering issues by neural networks to effectively process high dimensional and nonlinear complex data and solves neural networks by using extreme learning machine to greatly improve running speed of the clustering algorithm. The extreme learning machine is a learning method of single hidden layer feed-forward network and is proposed by Professor Guangbin Huang in 2004. Different from improved gradient descent method of traditional neural networks, learning process of the extreme learning machine doesn't need iterations, which greatly reduces training time. Besides, the present invention takes k-means algorithm as a basic framework, so that parallelizing means for accelerating can be used to reduce time cost of clustering. And the present invention is based on neural networks with the extreme learning machine and only uses a small amount of exemplar sets to train, therefore shorter computing time and less memory consumption is needed.

In general, the present invention resolves issues that traditional clustering algorithm can't properly process clustering problem of high dimensional and nonlinear data space and that new clustering algorithm consumes a larger memory or need longer running time and is capable of effectively processing clustering problem of large-scale and complex data.

SUMMARY

The present invention is to provide a clustering method based on iterations of neural networks. The present invention is based on a framework of traditional clustering algorithm, uses neural networks on similarity measurement and optimizes network structure continuously to get a more accurate similarity measurement.

The present invention may be implemented by: a clustering method based on iterations of neural networks comprising the following steps:

step 1, initializing parameters of an extreme learning machine;

step 2, randomly choosing samples of which number is equal to the number of clusters, each sample representing one cluster; and training the extreme learning machine to obtain an initial output weights between hidden-layer and output-layer;

step 3, using current extreme learning machine to cluster samples;

step 4, choosing multiple samples from each cluster as exemplars for the cluster according to a rule;

step 5, retraining the extreme learning machine by using the exemplars for each cluster obtained from previous step; and step 6, outputting clustering result if termination condition is met, otherwise going back to step 3.

Preferably, step 1 comprises two substeps:

substep 1.1, setting a number of hidden-layer neurons L, an activation function of hidden-layer $g(\theta)$, and a regularization factor $\gamma$ of the extreme learning machine, wherein the number of hidden-layer neurons L is greater than a feature dimension d of sample, the activation function of hidden-layer $g(\theta)$ usually adopts Sigmoid function, and value range of the regularization factor $\gamma$ is generally $[10^{-5}, 10^{10}]$; and substep 1.2, randomly initializing weights between input-layer and hidden-layer W and a bias b of the extreme learning machine, wherein the weights between input-layer and hidden-layer W is a random matrix with d rows and L columns whose random range is $[-1,1]$, and the bias b is a random matrix with 1 row and L columns whose random range is $[-1,1]$, one of columns of the bias corresponding to a bias of a hidden-layer neuron.

Preferably, step 2 comprises two substeps:

substep 2.1, randomly choosing samples of which number is equal to a number of clusters, that is, choosing K samples, each sample representing one cluster, so as to form an initial exemplar set and corresponding target output to train the extreme learning machine; and substep 2.2, calculating an output of the hidden-layer neurons $H^{(0)}$ and output weights between hidden-layer and output-layer $\beta^{(0)}$ to obtain an initial model of the extreme learning machine through Eq. (2), Eq. (3) and Eq. (4):

$$H^{(0)} = g(W \cdot E^{(0)} + B^{(0)}) \qquad (2)$$

$$\text{if } K > L, \beta^{(0)} = \left(H^{(0)T} H^{(0)} + \frac{I_L}{\gamma}\right)^{\dagger} H^{(0)T} T^{(0)} \qquad (3)$$

$$\text{else } \beta^{(0)} = H^{(0)T} \left(H^{(0)} H^{(0)T} + \frac{I_K}{\gamma}\right)^{\dagger} T^{(0)} \qquad (4)$$

wherein $B^{(0)}$ is a row-expansive matrix of the bias b of which number of rows is equal to that of $E^{(0)}$, which is a matrix with K rows and L columns, K being the number of clusters, and L being the number of hidden-layer neurons, $H^{(0)T}$ represents a transpose of the matrix $H^{(0)}$, $(\bullet)^{\dagger}$ represents a generalized inverse matrix, $I_L$ is an identity matrix of L dimension, and $I_K$ is an identity matrix of K dimension.

Preferably, step 3 comprises two substeps:

Substep 3.1, calculating an output value of the sample $x_i$ on an output-layer neuron $o_i$ by using parameters of the extreme learning machine currently used through Eq. (5) and Eq. (6), wherein the weights between input-layer and hidden-layer W, the bias b, the activation function of hidden-layer g(θ), the number of hidden-layer neurons L and the regularization factor γ are changeless during iterations, while the output weights between hidden-layer and output-layer β continues to change as iterations progress, Eq. (5) and Eq. (6) being as follows:

$$h_i = g(Wx_i + b) \quad (5)$$

$$o_i = h_i \beta^{(m-1)} \quad (6)$$

wherein $h_i$ represents an output value of the sample $x_i$ on the hidden-layer and is a matrix with 1 row and L columns, $o_i$ represents the output value of the sample $x_i$ on the output-layer and is a matrix with 1 row and K columns, and $\beta^{(m-1)}$ represents output weights between hidden-layer and output-layer obtained in the previous iteration; and substep 3.2, clustering the samples according to the output value of the samples on the output-layer neurons, wherein assigning rule is that a sample should be assigned to a cluster corresponding to the neuron with the highest output value of the output-layer neurons on basis of which the number of the output-layer neurons is equal to the number of clusters.

Preferably, step 4 comprises two substeps:

substep 4.1, calculating each cluster mean mean according to clustering result of step 3; and substep 4.2, calculating distances between each sample of the cluster and a cluster center in each cluster, and choosing ρ samples which are the nearest to the cluster center to form an exemplar set of current iteration $E^{(m)}$, wherein if the number of samples of a cluster is less than the number of exemplars ρ required to be selected from the cluster, all samples of the cluster are selected to be exemplars for the cluster; and if a cluster doesn't contain any sample, a sample as a exemplar for the cluster should be randomly selected from all samples with exception of exemplar sets for all the other clusters.

Preferably, step 5 comprises two substeps:

substep 5.1, constructing target functions for exemplar sets obtained from step 4; and substep 5.2, calculating an output of the hidden-layer neurons $H^{(m)}$ and output weights between hidden-layer and output-layer $\beta^{(m)}$ of the extreme learning machine after being retrained through Eq. (7), Eq. (8) and Eq. (9):

$$H^{(m)} = g(W \cdot E^{(m)} + B^{(m)}) \quad (7)$$

$$\text{if } K \times \rho > L, \beta^{(m)} = \left(H^{(m)T} H^{(m)} + \frac{I_L}{\gamma}\right)^\dagger H^{(m)T} T^{(m)} \quad (8)$$

$$\text{else } \beta^{(m)} = H^{(m)T} \left(H^{(m)} H^{(m)T} + \frac{I_{K \times \rho}}{\gamma}\right)^\dagger T^{(m)} \quad (9)$$

wherein $B^{(m)}$ is a row-expansive matrix of the bias b of which number of rows is equal to that of $E^{(m)}$, which is a matrix with K×ρ rows and L columns, K being the number of clusters, ρ being the number of exemplars of each cluster, and L being the number of hidden-layer neurons. $H^{(m)T}$ represents a transpose of the matrix $H^{(m)}$, $(\bullet)^\dagger$ represents the generalized inverse matrix, $I_L$ is the identity matrix of L dimension, and $I_{K \times \rho}$ is an identity matrix of K×ρ dimension.

DETAILED DESCRIPTION

Figure 1:
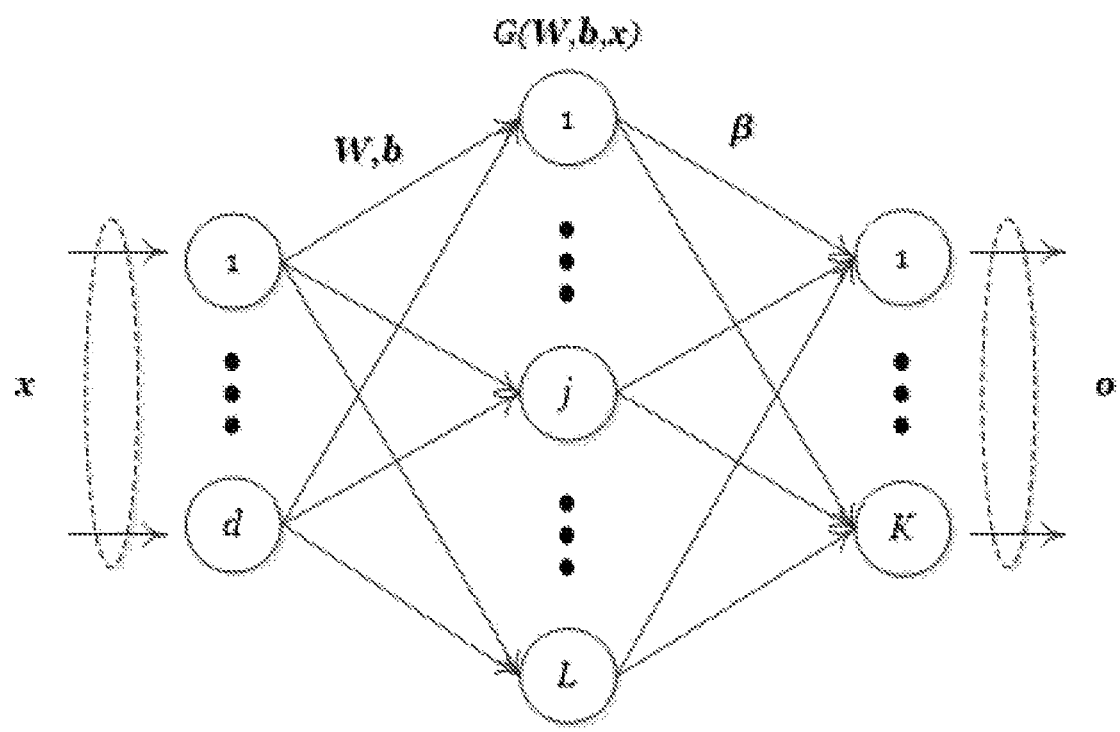
FIG. 1 is a frame diagram of an extreme learning machine.
Figure 2:
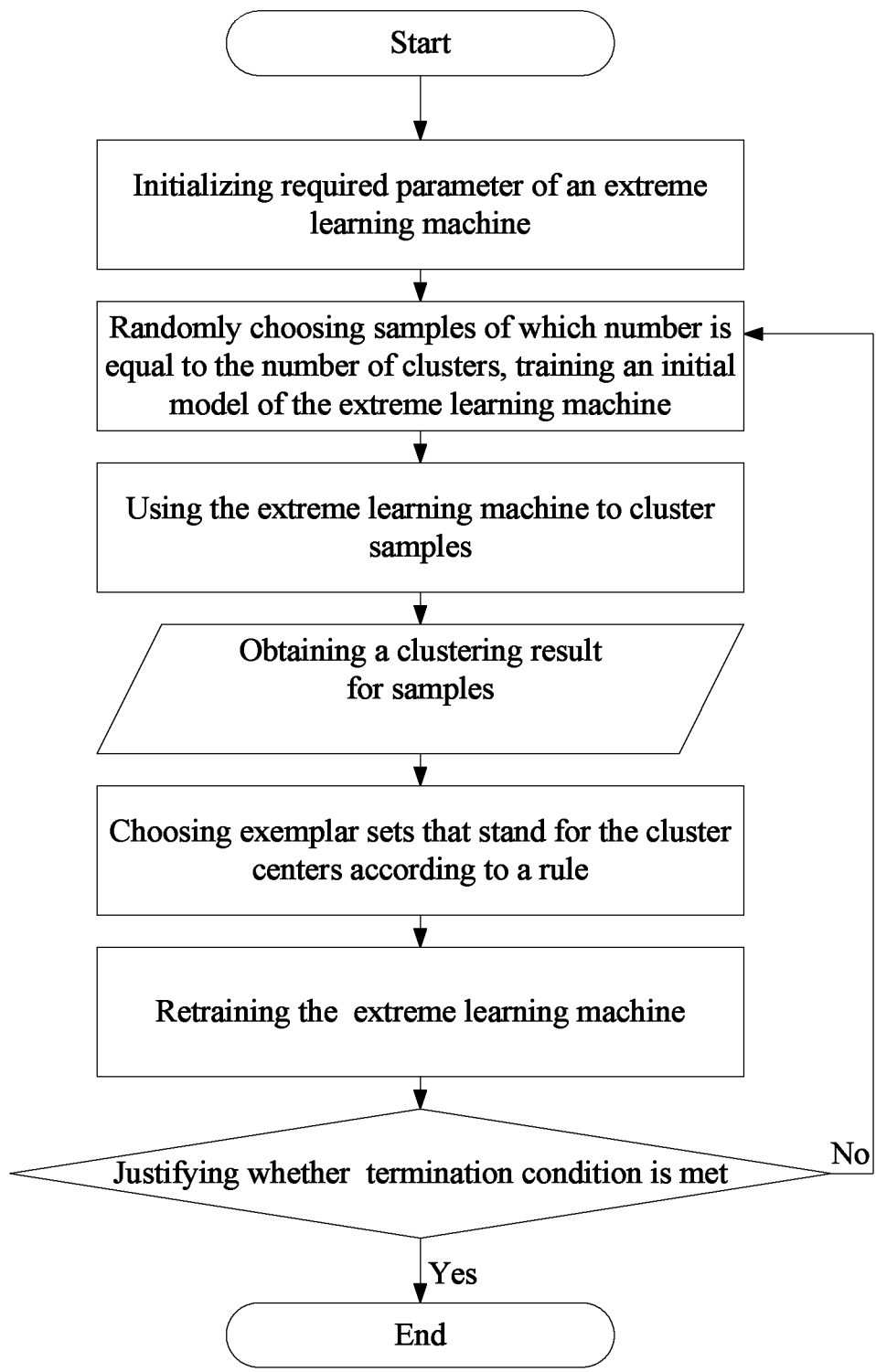
FIG. 2 is a flow diagram of a clustering algorithm based on iterations of neural networks of the present invention.

Below is a detailed description to further describe the present invention.

The present invention specifies a sample set to be clustered $D = \{x_i | x_i \in R^d, i=1, \ldots, N\}$ and a number of clusters K, wherein d is a feature dimension of sample, N is a number of samples, and $x_i$ is a d-dimension eigenvectors which is a matrix with 1 row and d columns. We here takes a sample set to be clustered implemented by Iris dataset of UCI as an example, wherein the number of clusters K is 3, the feature dimension d of sample is 4, the number of samples N is 150, and $x_i$ is a matrix with 1 row and 4 columns.

Firstly, the present invention completes task that initializes required parameter of an extreme learning machine in step 1, wherein step 1 comprises two substeps:

Substep 1.1, the present invention sets a number of hidden-layer neurons L, an activation function of hidden-layer g(θ), and a regularization factor γ of the extreme learning machine, wherein the number of hidden-layer neurons L is generally greater than the feature dimension d of sample. In the present invention, the number of hidden-layer neurons has little impact on final clustering result, and is generally 1000 or 2000. The activation function of hidden-layer g(θ) usually adopts Sigmoid function, wherein the Sigmoid function is indicated in Eq. (1):

$$g(\vartheta) = \frac{1}{1 + g^{-\vartheta}} \quad (1)$$

If θ is a matrix, Eq. (1) is interpreted to calculate Sigmoid function for each element of the matrix. Value range of the regularization factor γ is generally $[10^{-5}, 10^{10}]$, and value of the regularization factor can be slightly adjusted according to different datasets. In this embodiment, the number of hidden-layer neurons L is 1000, the activation function of hidden-layer g(θ) is the Sigmoid function, and the regularization factor γ is 108.

Substep 1.2, the present invention randomly initializes weights between input-layer and hidden-layer W and a bias b of the extreme learning machine.

Since both the number of the input-layer neurons and the feature dimension of sample are d, and the number of hidden-layer neurons is L, the weights between input-layer and hidden-layer W is a random matrix with d rows and L columns whose random range is generally [−1,1], and the bias b is a random matrix with 1 row and L columns whose random range is generally [−1,1], one of columns of the bias corresponding to a bias of a hidden-layer neuron. In this embodiment, the weights between input-layer and hidden-layer W is a random matrix with 3 rows and 1000 columns whose random range is [−1,1], and the bias b is a random matrix with 1 row and 1000 columns whose random range is [−1,1].

It should be noted that data is required to be normalized while using learning model of neural networks. Linear function, or zero-mean standardization which could map data into [0,1] is generally adopted to normalize. This embodiment adopts linear function to normalize.

Next, an initial model of the extreme learning machine is obtained by step 2 which comprises two substeps:

Substep 2.1, the present invention randomly selects samples of which number is equal to the number of clusters, that is, selects K samples, each sample representing one cluster, so that an initial exemplar set $E^{(0)}$ and corresponding target output $T^{(0)}$ are formed to train the extreme learning machine. It should be noted that training a neural network requires to generate a target output for each sample for which what is usually to do is to set the bit that represents classification of a sample into "1" and other bits into "0". Taking 3 randomly selected samples from Iris dataset of UCI as an example, as presented in Table 1:

TABLE 1 table for the samples and corresponding target outputs

| Initial exemplar set $E^{(0)}$ | Target output $T^{(0)}$ | Classification of a sample |
|---|---|---|
| [0.54, 0.47, 0.54, 0.60] (random sample 1) | [1 0 0] | First class |
| [0.66, 0.54, 0.72, 0.91] (random sample 2) | [0 1 0] | Second class |
| [0.13, 0.58, 0.10, 0.05] (random sample 3) | [0 0 1] | Third class |

In above example, the initial exemplar sets $E^{(0)}$ can also be presented as $$E^{(0)} = \begin{bmatrix} 0.54 & 0.47 & 0.54 & 0.60 \\ 0.66 & 0.54 & 0.72 & 0.91 \\ 0.13 & 0.58 & 0.10 & 0.05 \end{bmatrix},$$

and the target outputs $T^{(0)}$ as $$T^{(0)} = \begin{bmatrix} 1 & 0 & 0 \\ 0 & 1 & 0 \\ 0 & 0 & 1 \end{bmatrix}.$$

Substep 2.2, the present invention calculates an output of the hidden-layer neurons $H^{(0)}$ and weights of the hidden-layer relative to an output-layer $\beta^{(0)}$ to obtain the initial model of the extreme learning machine through Eq. (2), Eq. (3) and Eq. (4):

$$H^{(0)} = g(W \cdot E^{(0)} + B^{(0)}) \quad (2)$$

$$\text{if } K > L, \beta^{(0)} = \left(H^{(0)T}H^{(0)} + \frac{I_L}{\gamma}\right)^{\dagger} H^{(0)T} T^{(0)} \quad (3)$$

$$\text{else } \beta^{(0)} = H^{(0)T}\left(H^{(0)}H^{(0)T} + \frac{I_K}{\gamma}\right)^{\dagger} T^{(0)} \quad (4)$$

wherein $B^{(0)}$ is a row-expansive matrix of the bias b of which number of rows is equal to that of $E^{(0)}$, which is a matrix with K rows and L columns, K being the number of clusters, L being the number of hidden-layer neurons, $H^{(0)T}$ represents a transpose of the matrix $H^{(0)}$, $(\bullet)^{\dagger}$ represents a generalized inverse matrix, $I_L$ is an identity matrix of L dimension, and $I_K$ is an identity matrix of K dimension.

For instance, when the number of hidden-layer neurons is 1000 and 3 samples are randomly selected, the bias b and its row-expansive matrix $B^{(0)}$ are:

$$b = [\,0.033 \quad \ldots \quad -0.334 \quad 0.125\,]_{1\times1000},$$

$$B^{(0)} = \begin{bmatrix} 0.033 & \ldots & -0.334 & 0.125 \\ 0.033 & \ldots & -0.334 & 0.125 \\ 0.033 & \ldots & 0.334 & 0.125 \end{bmatrix}_{3\times1000}$$

Below is iteration part, wherein m represents a number of iterations with an initial value of 1. The present invention uses a extreme learning machine of previous iteration to cluster the samples in step 3 which comprises two substeps:

Substep 3.1, in the extreme learning machine used in following calculation, the weights between input-layer and hidden-layer W, the bias b, the activation function of hidden-layer $g(\theta)$, the number of hidden-layer neurons L and the regularization factor $\gamma$ are changeless during iterations, while the output weights between hidden-layer and output-layer $\beta$ continues to change as iterations progress. Output value of a sample on an output-layer neuron is calculated by using parameters of current extreme learning machine through Eq. (5) and Eq. (6):

$$h_i = g(Wx_i + b) \quad (5)$$

$$o_i = h_i \beta^{(m-1)} \quad (6)$$

wherein $h_i$ represents an output value of the sample $x_i$ on the hidden-layer and is a matrix with 1 row and L columns, $o_i$ represents the output value of the sample $x_i$ on the output-layer and is a matrix with 1 row and K columns, and $\beta^{(m-1)}$ represents output weights between hidden-layer and output-layer obtained in the previous iteration.

Substep 3.2, according to the output value of the samples on the output-layer neurons, the samples are clustered. On basis of which the number of the output-layer neurons is equal to the number of clusters, assigning rule is that a sample should be assigned to a cluster corresponding to the neuron with the highest output value of the output-layer neurons.

For instance, when the number of clusters for Iris dataset of UCI is 3, output value of a sample on an output-layer neuron and clustering result are presented in Table 2:

TABLE 2 table for output value of a sample on an output-layer neuron and clustering result

| Sample NO. | Eigenvectors of the sample $x_i$ | Output value of a samples on an output-layer neuron $o_i$ | Cluster assigned |
|---|---|---|---|
| 1 | [0.66, 0.41, 0.71, 0.91] | [0.18, 0.90, −0.08] | Second class |
| 2 | [0.61, 0.41, 0.76, 0.70] | [0.31, 0.72, −0.03] | Second class |
| 3 | [0.66, 0.54, 0.79, 0.83] | [−0.15, 1.10, 0.05] | Second class |
| 4 | [0.69, 0.33, 0.64, 0.54] | [0.42, 0.52, 0.04] | Second class |
| 5 | [0.63, 0.37, 0.61, 0.50] | [0.36, 0.49, 0.13] | Second class |
| 6 | [0.22, 0.70, 0.08, 0.12] | [−0.26, 0.19, 1.07] | Third class |
| 7 | [0.69, 0.50, 0.83, 0.91] | [−0.06, 1.12, −0.05] | Second class |
| 8 | [0.11, 0.50, 0.10, 0.04] | [0.58, −0.37, 0.79] | Third class |
| 9 | [0.44, 0.41, 0.54, 0.58] | [0.47, 0.37, 0.14] | First class |
| 10 | [0.66, 0.45, 0.76, 0.70] | [0.22, 0.77, 0.01] | Second class |
| 11 | [0.25, 0.29, 0.49, 0.54] | [1.12, −0.11, −0.01] | First class |
| 12 | [0.52, 0.08, 0.59, 0.58] | [1.41, −0.11, −0.31] | First class |
| 13 | [1.00, 0.75, 0.91, 0.79] | [−1.21, 1.86, 0.35] | Second class |
| 14 | [0.13, 0.58, 0.10, 0.04] | [0.27, −0.18, 0.91] | Third class |
| 15 | [0.25, 0.87, 0.08, 0.00] | [−0.81, 0.45, 1.37] | Third class |
| … | … | … | … |

Next, on the basis of clustering result of step 3, task of step 4 is to select multiple samples from each cluster as exemplars for the cluster according to a rule.

There are usually two kinds of rules: 1) choosing ρ samples which are the nearest to a cluster center in a cluster (that is a mean of all samples of the cluster) as exemplars of the cluster on original space, wherein ρ is a number of exemplars usually with value range of [5,10]; 2) choosing ρ samples which are the nearest to a cluster center in a cluster as exemplars for the cluster on hidden-layer space (also called extreme learning machine feature space).

The present invention adopts the first kinds of rules, therefore step 4 can be divided into following two substeps:

Substep 4.1, according to the clustering result of step 3, the present invention calculates each cluster mean MEAN. For instance, when the number of clusters for Iris dataset of UCI is 3, cluster means are presented in Table 3:

TABLE 3 table for cluster means

| Sample NO. | Eigenvector of the samples $x_i$ | Cluster assigned | Cluster mean MEAN |
|---|---|---|---|
| 9 | [0.44, 0.41, 0.54, 0.58] | First class | [0.40, 0.25, 0.52, 0.54] |
| 11 | [0.25, 0.29, 0.49, 0.54] | First class | |
| 12 | [0.52, 0.08, 0.59, 0.58] | First class | |
| ... | ... | ... | |
| 1 | [0.66, 0.41, 0.71, 0.91] | Second class | [0.69, 0.47, 0.76, 0.70] |
| 2 | [0.61, 0.41, 0.76, 0.70] | Second class | |
| 3 | [0.66, 0.54, 0.79, 0.83] | Second class | |
| 4 | [0.69, 0.33, 0.64, 0.54] | Second class | |
| 5 | [0.63, 0.37, 0.61, 0.50] | Second class | |
| 13 | [1.00, 0.75, 0.91, 0.79] | Second class | |
| 7 | [0.69, 0.50, 0.83, 0.91] | Second class | |
| 10 | [0.66, 0.45, 0.76, 0.70] | Second class | |
| ... | ... | ... | |
| 6 | [0.22, 0.70, 0.08, 0.12] | Third class | [0.16, 0.63, 0.09, 0.05] |
| 8 | [0.11, 0.50, 0.10, 0.04] | Third class | |
| 14 | [0.13, 0.58, 0.10, 0.04] | Third class | |
| 15 | [0.25, 0.87, 0,08, 0.00] | Third class | |
| ... | ... | ... | |

Substep 4.2, in each cluster, distances between each sample of the cluster and a cluster center (Euclidean distance) are calculated and ρ samples which are the nearest to the cluster center (cluster mean) are selected to form an exemplar set of current iteration $E^{(m)}$. The distance between each sample of the cluster and the cluster center are presented in Table 4 and the exemplar sets of current iteration $E^{(m)}$ are presented in Table 5:

TABLE 4 table for the distances between each sample of a cluster and a cluster center

| Sample NO. | Eigenvector of the samples $x_i$ | Cluster assigned | distances between each sample of a cluster and a cluster center |
|---|---|---|---|
| 9 | [0.44, 0.41, 0.54, 0.58] | First class | 0.1709 |
| 11 | [0.25, 0.29, 0.49, 0.54] | First class | 0.1581 |
| 12 | [0.52, 0.08, 0.59, 0.58] | First class | 0.2232 |
| ... | ... | ... | ... |
| 1 | [0.66, 0.41, 0.71, 0.91] | Second class | 0.2361 |
| 2 | [0.61, 0.41, 0.76, 0.70] | Second class | 0.1000 |
| 3 | [0.66, 0.54, 0.79, 0.83] | Second class | 0.1536 |
| 4 | [0.69, 0.33, 0.64, 0.54] | Second class | 0.2441 |
| 5 | [0.63, 0.37, 0.61, 0.50] | Second class | 0.2759 |
| 13 | [1.00, 0.75, 0.91, 0.79] | Second class | 0.4529 |
| 7 | [0.69, 0.50, 0.83, 0.91] | Second class | 0.2234 |
| 10 | [0.66, 0.45, 0.76, 0.70] | Second class | 0.0361 |
| ... | ... | ... | ... |
| 6 | [0.22, 0.70, 0.08, 0.12] | Third class | 0.1162 |
| 8 | [0.11, 0.50, 0.10, 0.04] | Third class | 0.1400 |
| 14 | [0.13, 0.58, 0.10, 0.04] | Third class | 0.0600 |
| 15 | [0.25, 0.87, 0.08, 0.00] | Third class | 0.2613 |
| ... | ... | ... | ... |

TABLE 5 table for the exemplar set of current iteration $E^{(m)}$

| Sample NO. | Eigenvector of the samples $x_i$ | Cluster assigned | The distances between each sample in the cluster and the cluster center |
|---|---|---|---|
| 9 | [0.44, 0.41, 0.54, 0.58] | First class | 0.1709 |
| 11 | [0.25, 0.29, 0.49, 0.54] | First class | 0.1581 |
| 12 | [0.52, 0.08, 0.59, 0.58] | First class | 0.2232 |
| 2 | [0.61, 0.41, 0.76, 0.70] | Second class | 0.1000 |
| 3 | [0.66, 0.54, 0.79, 0.83] | Second class | 0.1536 |
| 10 | [0.66, 0.45, 0.76, 0.70] | Second class | 0.0361 |
| 6 | [0.22, 0.70, 0.08, 0.12] | Third class | 0.1162 |
| 8 | [0.11, 0.50, 0.10, 0.04] | Third class | 0.1400 |
| 14 | [0.13, 0.58, 0.10, 0.04] | Third class | 0.0600 |

It is noted that: if the number of samples of a cluster is less than the number of exemplars ρ required to be selected from the cluster, all samples of the cluster are selected to be exemplars for the cluster; and if a cluster doesn't contain any sample, a sample as a exemplar for the cluster should be randomly selected from all samples with exception of exemplar sets for all the other clusters.

Then, in step 5, the extreme learning machine is retrained by using the exemplar sets of each cluster obtained from step 4. Step 5 comprises two substeps:

Substep 5.1, target functions are constructed for exemplar sets obtained from step 4, as indicated in Table 6:

TABLE 5 table for the exemplar sets and corresponding target output

| Exemplar set of current iteration $E^{(m)}$ | Corresponding target output $T^{(m)}$ | Classification of a sample |
|---|---|---|
| [0.44, 0.41, 0.54, 0.58] | [1 0 0] | First class |
| [0.25, 0.29, 0.49, 0.54] | [1 0 0] | First class |
| [0.52, 0.08, 0.59, 0.58] | [1 0 0] | First class |
| [0.61, 0.41, 0.76, 0.70] | [0 1 0] | Second class |
| [0.66, 0.54, 0.79, 0.83] | [0 1 0] | Second class |
| [0.66, 0.45, 0.76, 0.70] | [0 1 0] | Second class |
| [0.22, 0.70, 0.08, 0.12] | [0 0 1] | Third class |
| [0.11, 0.50, 0.10, 0.04] | [0 0 1] | Third class |
| [0.13, 0.58, 0.10, 0.04] | [0 0 1] | Third class |

Substep 5.2, the present invention calculates an output of the hidden-layer neurons $H^{(m)}$ and output weights between hidden-layer and output-layer $\beta^{(m)}$ of the new extreme learning machine after being retrained through Eq. (7), Eq. (8) and Eq. (9):

$$H^{(m)} = g(W \cdot E^{(m)} + B^{(m)}) \qquad (7)$$

$$\text{if } K \times \rho > L, \beta^{(m)} = \left(H^{(m)T} H^{(m)} + \frac{I_L}{\gamma}\right)^{\dagger} H^{(m)T} T^{(m)} \qquad (8)$$

$$\text{else } \beta^{(m)} = H^{(m)T} \left(H^{(m)} H^{(m)T} + \frac{I_{K \times \rho}}{\gamma}\right)^{\dagger} T^{(m)} \qquad (9)$$

wherein $B^{(m)}$ is a row-expansive matrix of the bias b whose number of rows is equal to that of $E^{(m)}$ which is a matrix with K×ρ rows and L columns, K being the number of clusters, ρ being the number of exemplars of each cluster, and L being the number of hidden-layer neurons, $H^{(m)T}$ represents a transpose of the matrix $H^{(m)}$, $(\bullet)^{\dagger}$ represents the generalized inverse matrix, $I_L$ is the identity matrix of L dimension, and $I_{K \times \rho}$ is an identity matrix of K×ρ dimension.

At last, the present invention sets termination conditions of the iteration and step 6 completes a judgment to the termination conditions. If any of the termination conditions is met, current clustering result is outputted, otherwise next iteration requires to progress by going back to step 3 with adding one to m that represents the number of iterations.

There are two termination conditions adopted by the present invention.

Once any of these two termination condition is met, the iteration ends.

1) if the number of iterations is greater than a maximal limit of the number of iterations, which meets Eq. (10), the iteration ends:

$$m > \text{MaxIteration} \quad (10)$$

wherein m represents current number of iterations and MaxIteration is the maximal limit of the number of iterations.

2) if a sum of squares of a cluster S is steady, the iteration ends. The sum of squares of a cluster S is a sum of squares of distances, each of distance being an distance between an observation point and corresponding cluster center. Equation for calculating the sum of squares of a cluster S is:

$$s = \Sigma_{k=1}^{K} \Sigma_{x \in C_k} \|x - \text{MEAN}_k\|^2 \quad (11)$$

wherein $C_k$ stands for current sample set of the kth cluster, x represents a sample, $\text{MEAN}_k$ stands for the kth cluster mean.

If following condition is met by consecutive five iterations, the sum of squares of a cluster S is justified to be steady:

$$S^{(m)} - S^{(m-1)} < \exists, m \geq 2 \quad (12)$$

wherein $S^{(m)}$ represents a sum of squares of a cluster of current iteration, $S^{(m-1)}$ represents a sum of squares of a cluster of previous iteration, and E stands for a very small positive number.

Although the embodiments of the present invention have been disclosed above, but it is not limited to the applications set forth in the specification and embodiments, and can be applied to various fields suitable for the present invention. For those skilled in the art, other modifications may be easily achieved without departing the general concept defined by the claims and their equivalent. The present invention is not limited to particular details and illustrations shown and described herein.

What is claimed is:

1. A clustering method based on iterations of neural networks comprising the following steps:
    step 1, initializing parameters of an extreme learning machine;
    step 2, randomly choosing a number of samples for a number of clusters, each sample representing one cluster, and training the extreme learning machine to obtain an initial output weights between hidden-layer and output-layer;
    step 3, using the extreme learning machine to cluster samples;
    step 4, choosing multiple samples from each cluster as exemplars for the cluster according to a rule;
    step 5, retraining the extreme learning machine by using the exemplars for each cluster obtained from previous step; and
    step 6, outputting clustering result if termination condition is met, otherwise going back to step 3, wherein step 1 further comprises:

substep 1.1, setting a number of hidden-layer neurons L, an activation function of hidden-layer $g(\theta)$, and a regularization factor $\gamma$ of the extreme learning machine, wherein the number of hidden-layer neurons L is greater than a feature dimension d of sample, the activation function of hidden-layer $g(\theta)$ adopts Sigmoid function, and value range of the regularization factor $\gamma$ is $[10^{-5}, 10^{10}]$; and
    substep 1.2, randomly initializing weights between an input-layer and an hidden-layer W and a bias b of the extreme learning machine, wherein the weights between the input-layer and the hidden-layer W is a random matrix with d rows and L columns with a random range of $[-1,1]$, and the bias b is a random matrix with 1 row and L columns with a random range of $[-1,1]$, one of columns of the bias corresponding to a bias of a hidden-layer neuron.

2. The clustering method based on iterations of neural networks of claim 1, wherein step 2 comprises two substeps:
    substep 2.1, randomly choosing the number of samples for the number of clusters, that is, choosing K samples, each sample representing one cluster, so as to form an initial exemplar set and corresponding target output to train the extreme learning machine; and
    substep 2.2, calculating an output of the hidden-layer neurons $H^{(o)}$ and a output weights between hidden-layer and output-layer $\beta^{(o)}$ to obtain an initial model of the extreme learning machine through Eq. (2), Eq. (3) and Eq. (4):

$$H^{(0)} = g(W \cdot E^{(0)} + B^{(0)}) \quad (2)$$

$$\text{if } K > L, \beta^{(0)} = \left(H^{(0)T} H^{(0)} + \frac{I_L}{\gamma}\right)^{\dagger} H^{(0)T} T^{(0)} \quad (3)$$

$$\text{else } \beta^{(0)} = H^{(0)T} \left(H^{(0)} H^{(0)T} + \frac{I_K}{\gamma}\right)^{\dagger} T^{(0)} \quad (4)$$

wherein $B^{(0)}$ is a row-expansive matrix of a bias b of which number of rows is equal to that of $E^{(0)}$, which is a matrix with K rows and L columns, K being the number of clusters, and L being the number of hidden-layer neurons, $H^{(0)T}$ represents a transpose of the matrix $H^{(0)}$, $(\bullet)^{\dagger}$ represents a generalized inverse matrix, $I_L$ is an identity matrix of L dimension, and $I_K$ is an identity matrix of K dimension, and $T^{(0)}$ represents target output.

3. The clustering method based on iterations of neural networks of claim 1, wherein step 3 comprises two substeps:
    Substep 3.1, calculating an output value of a sample $x_i$ on an output-layer neuron $o_i$ by using parameters of the extreme learning machine currently used through Eq. (5) and Eq. (6), wherein the weights between the input-layer and the hidden-layer W, a bias b, an activation function of hidden-layer $g(\theta)$, a number of hidden-layer neurons L and a regularization factor $\gamma$ are changeless during iterations, while the output weights between hidden-layer and output-layer $\beta$ continues to change as iterations progress, Eq. (5) and Eq. (6) being as follows:

$$h_i = g(Wx_i + b) \quad (5)$$

$$o_i = h_i \beta^{(m-1)} \quad (6)$$

wherein $h_i$ represents an output value of the sample $x_i$ on the hidden-layer and is a matrix with 1 row and L columns equal to the number of hidden-layer neurons, $o_i$ represents the output value of the sample $x_i$ on the output-layer and is a matrix with 1 row and K columns, and $\beta^{(m-1)}$ represents a output weights between hidden-layer and output-layer obtained in the previous iteration; and substep 3.2, clustering the samples according to the output value of the samples on the output-layer neurons, wherein a sample is assigned to a cluster corresponding to the neuron with the highest output value of the output-layer neurons.

4. The clustering method based on iterations of neural networks of claim 1, wherein step 4 comprises two substeps:

substep 4.1, calculating each cluster mean MEAN according to clustering result of step 3;

substep 4.2, calculating distances between each sample of the cluster and a cluster center in each cluster, and choosing $\rho$ samples which are the nearest to the cluster center to form an exemplar set of current iteration $E^{(m)}$, wherein if the number of samples of a cluster is less than the number of exemplars $\rho$ required to be selected from the cluster, all samples of the cluster are selected to be exemplars for the cluster; and if a cluster doesn't contain any sample, a sample as a exemplar for the cluster should be randomly selected from all samples with exception of exemplar sets for all the other clusters.

* * * * *